United States Patent [19]
Yamada et al.

[11] Patent Number: 5,483,666
[45] Date of Patent: Jan. 9, 1996

[54] METHOD FOR ALLOCATING CHANNELS IN A MICROCELLULAR SYSTEM

[75] Inventors: Jun Yamada; Masaki Terashima; Kenichi Ooyama, all of Yokohama; Eiji Ohmori, Ohya, all of Japan

[73] Assignee: Matsushita Electric Industrial Co., Ltd., Osaka, Japan

[21] Appl. No.: 959,722

[22] Filed: Oct. 13, 1992

[30] Foreign Application Priority Data

Oct. 21, 1991 [JP] Japan .................. 3-272246

[51] Int. Cl.⁶ .................................... H04Q 7/34
[52] U.S. Cl. .................. 455/33.1; 455/34.1; 455/62; 379/59
[58] Field of Search ................. 455/33.1, 33.4, 455/34.1, 34.2, 53.1, 56.1; 379/59, 60

[56] References Cited

U.S. PATENT DOCUMENTS

| | | | |
|---|---|---|---|
| 4,768,219 | 8/1988 | Yamagata et al. | 379/61 |
| 4,768,220 | 8/1988 | Yoshihara et al. | 379/63 |
| 4,771,448 | 9/1988 | Koohgoci et al. | 379/60 |
| 4,790,000 | 12/1988 | Kinoshita | 379/59 |
| 4,792,984 | 12/1988 | Matsuo | 455/33.4 X |
| 4,850,033 | 7/1989 | Eizenhofer et al. | 455/56 |
| 4,989,230 | 1/1991 | Gillig et al. . | |
| 5,040,238 | 8/1991 | Comroe et al. | 455/33.1 |
| 5,056,109 | 10/1991 | Gilhousen et al. | 375/1 |
| 5,067,147 | 11/1991 | Lee | 379/59 |
| 5,095,529 | 3/1992 | Comroe et al. | 459/16 |
| 5,101,500 | 3/1992 | Marui | 455/33 |
| 5,127,042 | 6/1992 | Gillig et al. | 379/59 |
| 5,152,002 | 9/1992 | Leslie et al. | 455/11.1 |
| 5,179,720 | 1/1993 | Grube et al. . | |
| 5,193,101 | 3/1993 | McDonald et al. | 455/33.1 |
| 5,193,109 | 3/1993 | Chien-Yeh Lee | 455/33.1 |
| 5,197,093 | 3/1993 | Knuth et al. | 379/61 |
| 5,203,015 | 4/1993 | George | 455/34.1 |
| 5,212,805 | 5/1993 | Comroe et al. | 455/33.1 |
| 5,237,603 | 8/1993 | Yamagata et al. | 379/61 |
| 5,257,400 | 10/1993 | Yoshida | 455/33.1 |
| 5,257,401 | 10/1993 | Dahlin et al. | 455/33.2 |
| 5,260,988 | 11/1993 | Schellinger et al. | 379/59 |
| 5,276,730 | 1/1994 | Cimini, Jr. et al. | 379/60 |
| 5,303,287 | 4/1994 | Laborde | 379/59 |

FOREIGN PATENT DOCUMENTS

| | | |
|---|---|---|
| 0418096A2 | 9/1990 | European Pat. Off. . |
| 1-309528 | 12/1989 | Japan . |
| 1-309527 | 12/1989 | Japan . |
| 2-126736 | 5/1990 | Japan . |
| 2-193425 | 7/1990 | Japan . |
| 2234649 | 2/1991 | United Kingdom . |
| 2242806 | 10/1991 | United Kingdom . |
| 2252699 | 8/1992 | United Kingdom . |
| 2253968 | 9/1992 | United Kingdom . |
| 2255474 | 11/1992 | United Kingdom . |
| 2255476 | 11/1992 | United Kingdom . |
| WO86/06915 | 11/1986 | WIPO . |

*Primary Examiner*—Edward F. Urban
*Attorney, Agent, or Firm*—Amster, Rothstein & Ebenstein

[57] ABSTRACT

In a microcellular system operated in the same frequency band as a cellular system, an interference-free channel is automatically searched and allocated. The microcellular system which shares the frequency band with the cellular system comprises a control unit, a base station and a multi-channel selecting receiver. The multi-channel selecting receiver monitors a use status of cellular channels of the band to detect idling channels and allocates them to its own system. Whenever a communication request is issued, the base station detects a channel not used by its own system from the idling channels and allocates it for communication.

7 Claims, 4 Drawing Sheets

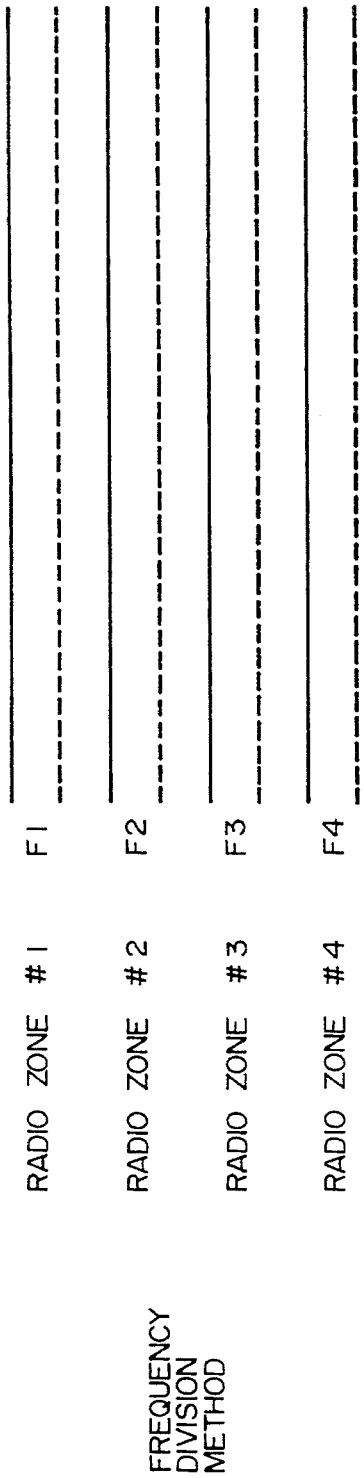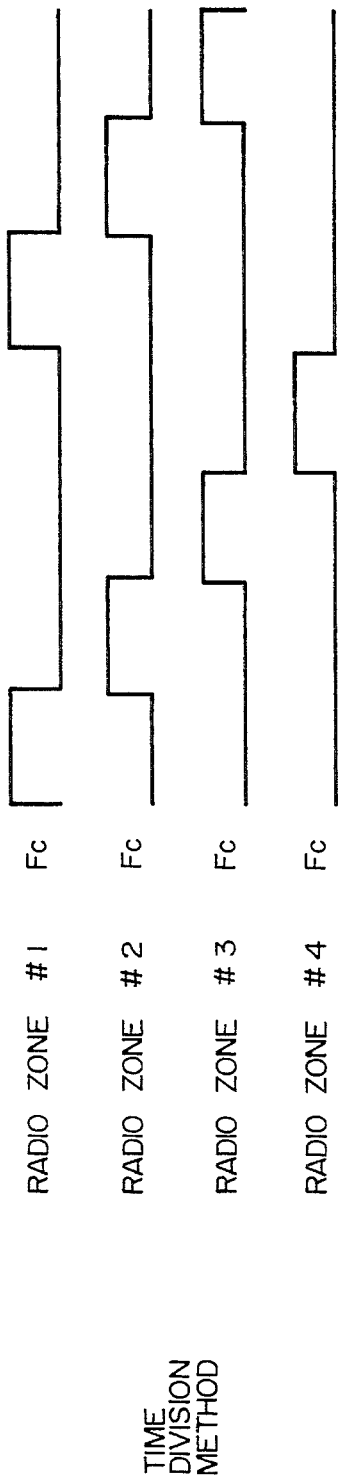

FREQUENCY DIVISION / TIME DIVISION DUAL METHOD

METHOD FOR ALLOCATING CHANNELS IN A MICROCELLULAR SYSTEM

BACKGROUND OF THE INVENTION

The present invention relates to a method for allocating a radio channel to be used in a microcellular system (MCS) of a portable telephone set which shares a frequency band with a cellular mobile telephone system (CMTS).

In the prior art, the allocation of a control channel and a speech channel in the MCS which shares the frequency band with the CMTS are carried out in the same system and configuration as those of the CMTS so that the CMTS is locally reduced in scale (which is commonly called as a cell split).

However, the prior art method includes the following problems.

1. When an MCS is to be installed in an area, reallocation of frequencies including those for neighboring CMTS's is required.

2. When a plurality of MCS's are to be arranged three-dimensionally in a multi-flow building, a frequency allocation plan is difficult to attain.

Accordingly, the frequency allocation to the MCS which shares the frequency band with the CMTS is very difficult job.

SUMMARY OF THE INVENTION

It is an object of the present invention to provide an improved method for allocating frequencies which does not require the change of frequencies even if the MCS and the CMTS coexist, facilitates the frequency allocation plan in the area, enhances the utilization efficiency of the available frequency spectrum, and permits access to both the MCS and the CMTS from a mobile terminal station.

In order to achieve the above object, there are provided a multi-channel selecting receiver for monitoring a use status of a radio channel of a CMTS frequency band to select idling channels in an installation area of an MCS, allocation means for allocating one or more channels from the selected channels to each base station of the MCS as a control channel, the base station of the MCS having a multi-channel selecting receiver function for selecting idling channels at a time of the occurrence of a speech request from the selected channels, and a mobile terminal station having a multi-channel selecting receiver function for searching and selecting a control channel different from that of the CMTS and allocated to each base station of the MCS by the allocation means when the MCS is to be accessed.

In accordance with the present invention, the MCS can set, at its own discretion, the control and speech communication paths by utilizing the idling channels in the area.

The mobile terminal station can access to either the CMTS or the MCS.

BRIEF DESCRIPTION OF THE DRAWINGS

FIG. 4 shows a time chart of control frequency allocation in a frequency division system, FIG. 5 shows a time chart of control frequency allocation of a time division system.

DESCRIPTION OF THE PREFERRED EMBODIMENTS

Configurations, channel selection and allocation and searching method of the embodiments of the present invention are now explained with reference to the drawings.

(1) System Configuration

Figure 1:
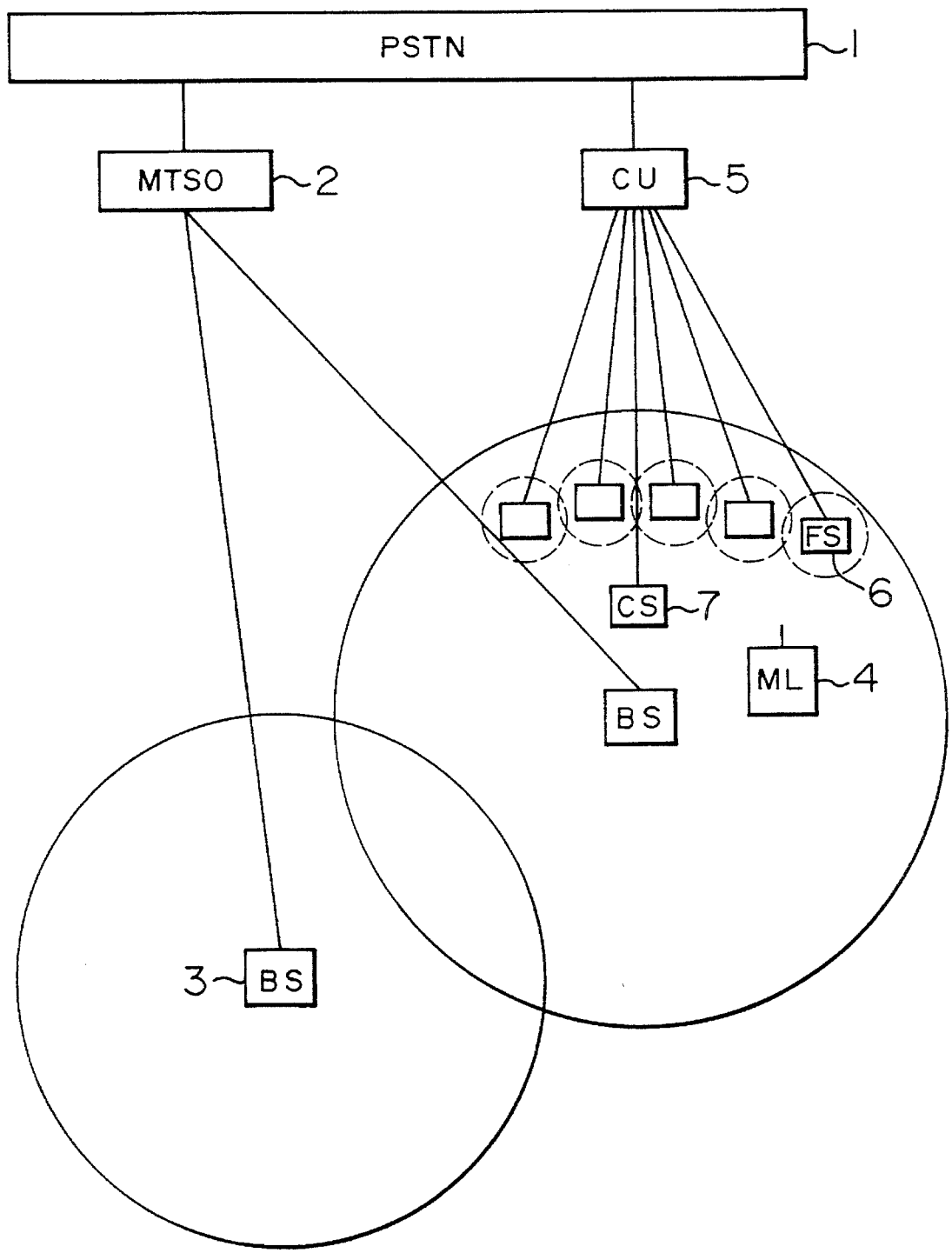
FIG. 1 shows a configuration of a microcellular system.

A configuration of a system which implements the present invention is shown in FIG. 1.

A cellular mobile telephone system (CMTS) comprises a mobile telephone switching office (MTSO) 2 connected to a public switched telephone network (PSTN) 1 and a base station (BS) connected to the MTSO 2, and a microcellular system (MCS) comprises a control unit (CU) 5 connected to the PSTN 1, a fixed station (FS) connected to the CU 5 and a cellular scanner (CS) 7.

Circles shown by solid lines indicate cover areas by the BS 3 of the CMTS, and circles shown by broken lines indicate cover areas by the FS 6, that is, radio zones. The cover area by the BS 3 usually has a radius of several kilometers and the cover area by the FS 6 usually has a diameter of several tenths kilometers. The MCS is installed in a high population area such as a building, a city center or an underground street.

A mobile station (ML) 4 accesses to the CMTS during high speed movement by an automobile, and when it enters into the high population area, it automatically or manually accesses to the MCS. It is assumed that the CMTS and the MCS share the same frequency band, and the ML 4 can access to either of them.

(2) Channel Selection Method in the MCS

The MCS which implements the present invention selects channels in the following manner.

The MCS uses a channel not used by the CMTS at the installed location or a channel which is used by the CMTS but wherein the received signal strength at the location is so small that a possibility of interference is very small.

Figure 2:
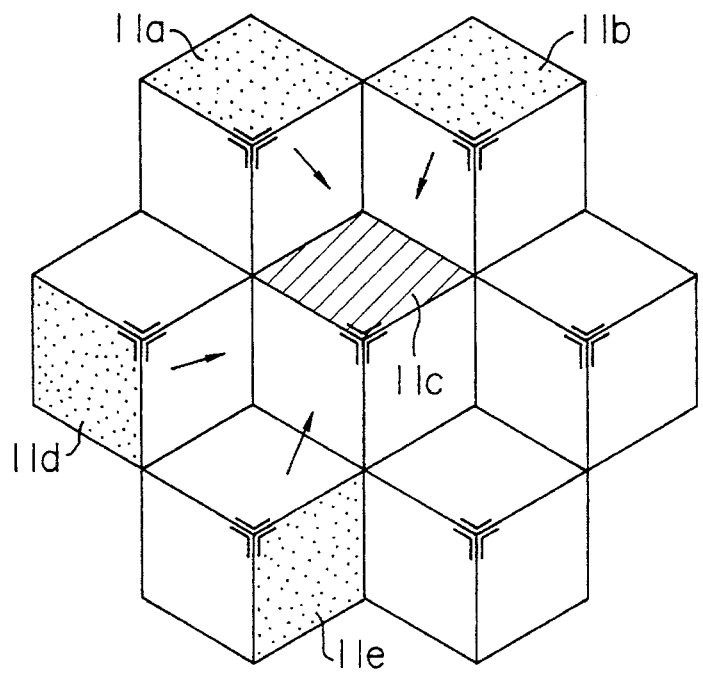
FIG. 2 shows a distant cellular zone which may be repeatedly used.

The channel not used by the CMTS can be naturally used by the MCS. Even if a channel is used by the CMTS, it may possibly be used in the area of the MCS if a transmission output of the MCS is sufficiently small, because the interference to the area of the MCS is smaller than those of the channels of other zones. For example, as shown in FIG. 2, when the CMTS is operated in a 7 cells×3 sectors system and the MCS is in a zone 11c of the CMTS, the channels used by zones 11a, 11b, 11d and 11e of the CMTS have smaller interference to the area of the MCS than the other zones have.

In addition, when the MCS is located at a position which is hard to receive an electromagnetic wave from the CMTS such as in a building or an underground street, there should be many channels which can be used by the MCS.

In the light of the above, a CS to monitor the use status of the channels of the CMTS at the location is installed in the MCS to search idling channels at the location.

Figure 3:
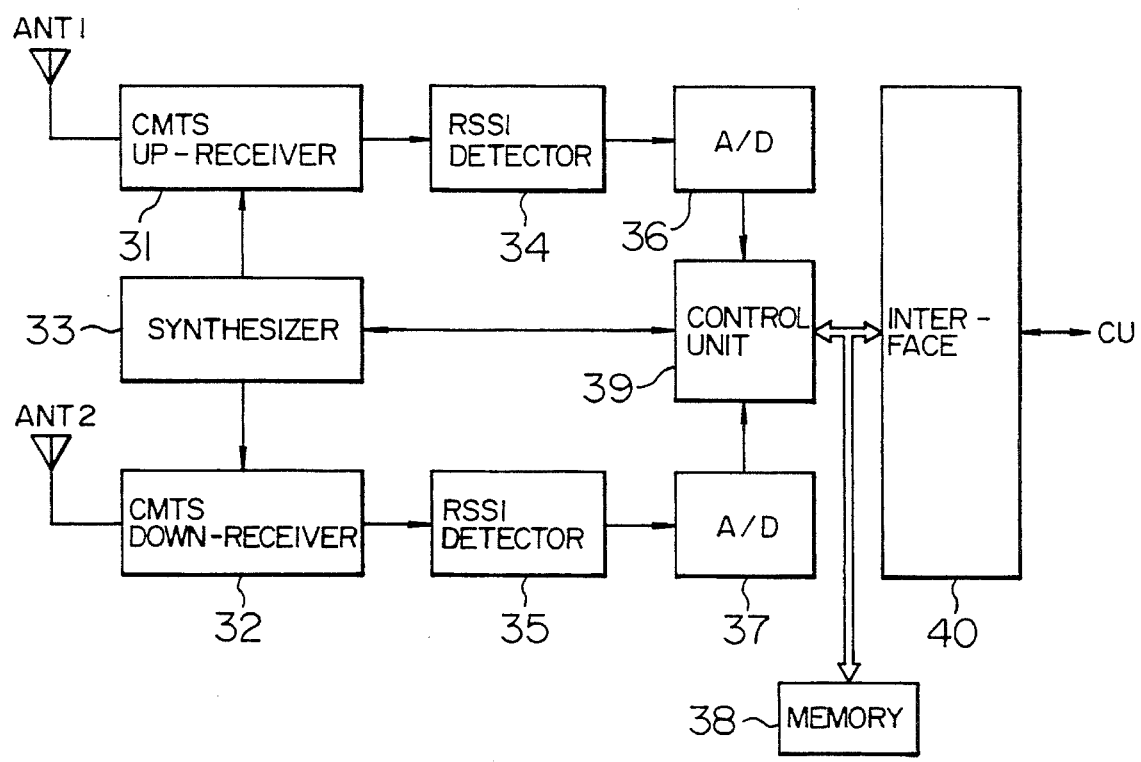
FIG. 3 shows a block diagram of a multi-channel selecting receiver.

FIG. 3 shows a block diagram of the CS.

The CS comprises two-channel receivers 31 and 32 for receiving an up-channel and a down-channel of the CMTS, a synthesizer 33 for generating a local signal of the receivers, received signal strength indicators (RSSI) 34 and 35 for converting received signal strengths of the receivers to DC signals, A/D converters 36 and 37 for quantizing the RSSI outputs, a memory 38 for storing the quantized signals, a control unit 39 for controlling the channel allocation of the receivers and the synthesizer and searching the idling channels, and an interface unit 40 for interfacing the transmission of the idling channel information to the CU of the MCS.

The receiver built in the CU may be a one-channel receiver for receiving the down-channel or the up-channel of the CMTS.

The present system is started prior to the operation of the MCS and searches the idling channels at the location by a method of a first embodiment or a second embodiment to be described below. (a) First Embodiment (All channels of the CMTS are searched)

1. When the CS is started, it measures the RSSI of each channel by sequentially switching the channels of the CMTS band and stores the result in the memory.

2. The CS repeats the measurement until it receives a stop command. The larger RSSI data for the same channel is always reserved.

3. When the CS receives the measurement stop command, it compares the RSSI's of the respective channels with a predetermined threshold level (TH) and selects the RSSI's which are smaller than the TH.

4. The selection result is transferred to the CU as the idling channel information for use as the communication channels in the MCS.

In the first embodiment, the start and the stop of the channel search of the CS may be automatically done by a timer or it may be manually done. Since the voice channel (V-CH) of the CMTS is transmitted only during the speech communication, there is a high possibility of non-detection unless monitoring is made for a long time. Accordingly, the channel search time in the CS is preferably as long as possible and a time of one week may be required.

In the selection of the idling channels, the peaks of the RSSI's and the threshold level are compared in the present embodiment. Alternatively, a probability that the RSSI exceeds the threshold level may be determined and the selection may be made based on the probability.

(b) Second Embodiment (Regular channel allocation information of the CMTS is used).

In the channel allocation of the CMTS in the U.S., each cell/sector is divided into 21 blocks, and at least one control channel is allocated to each block.

A down-electromagnetic wave of the control channel is always transmitted from a base station of the CMTS. Accordingly, the down-control channels of the 21 channels are first searched and the RSSI's are measured to determine which zone of the CMTS the MCS is close to and which zone of the CMTS the MCS is distant from.

If the distant zone of the CMTS is determined, there is a high possibility that the V-CH's used in that zone may be used by the MCS. Thus, this information may be effectively used in the idling channel search.

The operation of the CS based on the above concept is described below.

1. When the CS is started, the RSSI's of the down-control channels of the CMTS are measured channel by channel sequentially, and they are stored in the memory.

2. After the measurement, the RSSI's of the down-control channels are compared with a predetermined threshold level (TH1) to select the control channels having smaller RSSI's than TH1.

3. The V-CH's of the CMTS which belong to the same group as the control channels are read from the memory channel by channel to measure the RSSI's and they are stored in the memory. A relationship between the control channels and the V-CH's have been previously stored in the memory.

4. The CS repeats the measurement of the RSSI's described above until it receives a stop command. The larger RSSI data for the same channel is always reserved.

5. When the CS receives the measurement stop command, it compares the RSSI's of the respective channels with a predetermined threshold level (TH2) to select the channels having smaller RSSI's than TH2.

6. The selection result is transferred to the CU as idling channel information for use as the communication channel in the MCS.

In the second embodiment, if there is no or only a small number of down-control channels having smaller RSSI's than TH1, the V-CH's which belong to the group of other control channel may be searched.

The start and the stop of the channel search of the CS may be automatically done by a timer, or it may be manually done. Since the voice channel (V-CH) of the CMTS is transmitted only during the speech communication, there is a high possibility of non-detection unless monitoring is made for a long time. Accordingly, it is desirable that the channel search time in the CS is as long as possible. A time of one week long may be required.

In the selection of the idling channels, the peaks of the RSSI's and the threshold level are compared in the present embodiment. Alternatively, a probability that the RSSI exceeds the threshold level may be determined and the selection may be made based on the probability.

(3) Allocation of Control Channel to MCS

The MCS comprises one or an aggregation of radio zones. Each radio zone is controlled by one transmitter/receiver. A controlling transmitter/receiver therefor may be a fixed one in the radio zone or it may be appropriately switched.

Several channels out of the channels selected by the method for selecting the channels in the MCS described in (2) above are used to allocate the control channel to each of the radio zone in one of the following three methods.

Figure 6:
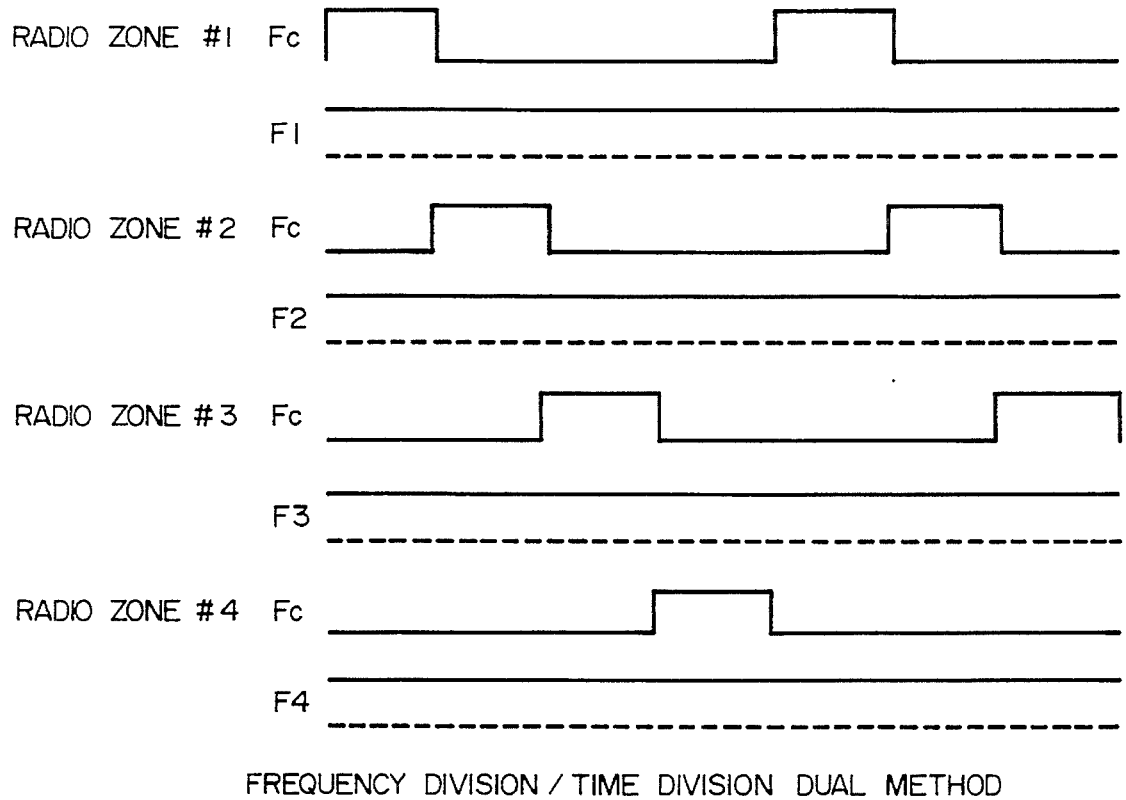
FIG. 6 shows a time chart of control frequency allocation in a frequency division/time division dual system.

FIGS. 4, 5 and 6 show time charts of the channel allocation in the respective methods. The respective methods have their own characteristics and they may be selected in accordance with the requirements of the system.

(a) Frequency Division Method (FIG. 4)

Control channels of different frequencies are allocated to the respective radio zones. The control channel informs the system information and the control channel numbers used by the radio zones, and calls the ML. The access from the ML may be done through this channel, or another control channel informed by the control channel.

In the present method, since the control channel is continuously transmitted, the ML can detect the control channel of the MCS in the same search method as that for the CMTS. The MCS can simultaneously call the ML's from all zones so that the call control is facilitated and the efficiency is high.

(b) Time Division Method (FIG. 5)

Different time slots on one frequency axis are allocated to the respective radio zones as the control channels. The control channel informs the system information and calls the ML.

In the present method, since only one control channel is used for the entire MCS, the frequency division system is used. Accordingly, it is not necessary to inform the control channel numbers used by the radio zones. The access from the ML may be made through the up-control channel or another control channel informed by the control channel.

In accordance with the present method, since the control channel is one channel without regard to the number of zones, the channels of the MCS can be effectively utilized. When the ML is synchronized with a time slot of the control channel, efficient battery saving is attained.

(c) Frequency Division/Time Division Dual Method (FIG. 6)

Channels of different frequencies and different time slots on the same frequency axis are allocated to the respective radio zones as control channels. The time division control channel informs the system information and the frequency division control channel numbers used in the radio zones. On the other hand, the frequency division control channel calls the ML. The two control channels may be controlled by one transmitter/receiver. For example, after the time division control channel has informed, the frequency division control channel may be selected, and it maintains the control until the time division control channel next informs. In the present method, the access from the ML may be done through the frequency division control channel or another control channel informed by the control channel.

In accordance with the present method, the detection of the control channel when the ML flows into the MCS is accelerated by previously entering the time division control channel numbers (or candidate channel numbers) to the ML. Further, the MCS can simultaneously call the ML's from all zones by the frequency division control channel, and the call control is facilitated and the efficiency is high.

(4) Voice Channel Selection Method in the Base Station of the MCS

A method for selecting a voice channel by the FS from the V-CH's selected by the method for selecting the channels in the MCS described in (2) above is explained.

Figure 7:
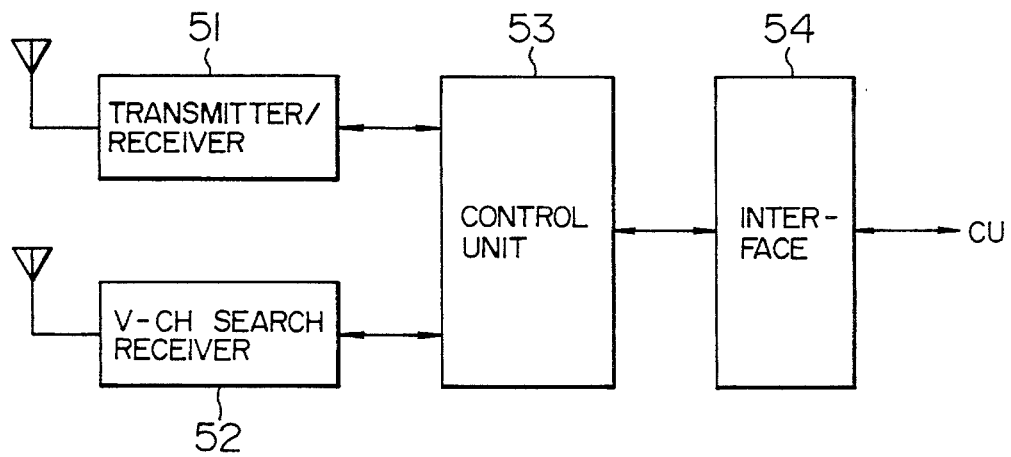
FIG. 7 shows a block diagram of a base station of a microcellular system.

FIG. 7 shows a block diagram of the FS of the present invention. In FIG. 7, the FS comprises a communication transmitter/receiver 51 for transmitting and receiving the control channel and the voice channel, a V-CH search receiver 52 for selecting V-CH's which can be used for speech communication from the channels V-CH's selected in the item (2) above, a control unit 53 for controlling the function of the FS and an interface unit 54 for interfacing with the CU.

The FS and the V-CS search receiver 52 operate in the following manner.

1. Prior to the operation, the FS receives the channel number information of the V-CH's selected by the item (2) above.

2. When the V-CH search receiver 52 is operated, it sequentially searches the V-CH's during the stand-by to monitor the RSSI's of the channels to determine whether they are above a predetermined threshold level (TH3) or not.

3. The monitoring is done on a continuous basis to always secure at least one V-CH channel having a smaller RSSI than TH3.

4. When a communication request to the ML is issued, the FS informs the V-CH number to the ML through the control channel prior to the start of the communication with the ML so that the subsequent speech communication is done through that channel.

5. The receiver may search the idling V-CH by the items 2 and 3 above even during the speech communication with the ML. This may be used as an alternative channel when the V-CH currently used for the speech communication becomes unusable by any interference.

Through the above sequence, the FS always secures the idling channel, and if other FS starts to use that channel, it searches another channel to secure it as the idling channel.

Thus, all FS's may share the V-CH's selected by the item (2) above and the channels can be effectively utilized.

(5) Method for Searching Control Channel in Mobile Terminal Station (ML)

When the ML flows into the MCS, it has to capture the control channel of the MCS to be ready for service. A cause of the flow-in to the MCS may be the manual switching by a user or automatic switching due to non-reception of the control channel of the CMTS.

The capturing operation of the MCS control channel in the ML after the initial start in the MCS mode may be done in one of the following two methods.

Those methods correspond to the methods (a) and (b) for searching the idling channels for the MCS in the item (1) above.

(a) All channels of the CMTS are searched

1. When the ML is started in the MCS mode, it measures the RSSI's of the respective channels by switching the channels of the CMTS band channel by channel and stores them in the memory. The ML conducts the measurement until all channels of the CMTS are searched.

2. The ML compares the RSSI's with a predetermined threshold level (TH) to select the channels having larger RSSI's than TH.

3. The channels selected in the item 2 above are again searched to eliminate the channels used by the CMTS and determine if the detection of data as the control channel of the MCS can be made by other channels.

4. If the control channel is detected in the item 3 above, the ML starts the operation as the control channel MCS. If the control channel is not detected, the search of all channels of the CMTS is repeated.

Where it is predetermined that the control channel of the MCS is in a specific area of the CMTS band, the channels of that band may be searched. (b) The regular channel allocation information of the CMTS is utilized.

The method for searching the channel for the MCS by the CS by utilizing the regular channel allocation information of the CMTS was described in the item (2) (b) above. The same concept may be applied to the ML to search the control channel of the MCS.

The channels to be used by the MCS are to be selected from the channels which are not used by the CMTS in the location. Accordingly, those channels are searched first. Then, the control channel of the MCS is selected from those channels.

An operation of the ML based on the above concept is described below.

1. When the ML is started in the MCS mode, it measures the RSSI's of the down-control channels of the CMTS channel by channel and stores them in the memory.

2. After the measurement, the ML compares the RSSI's of the respective channels with the predetermined threshold level (TH1) to select the control channels having smaller RSSI's than TH1.

3. The RSSI's are measured while the V-CH's of the CMTS which belong to the same group as the control channels are read from the memory channel by channel to select the channels which have larger RSSI's than the predetermined threshold TH2, and they are stored in the memory. A relationship between the control channels and the V-CH's has been previously stored in the memory.

4. The channels selected in the item 3 above are again searched to eliminate the channels used by the CMTS and determine if the detection of data as the control channel of the MCS can be made by other channels.

5. If the control channel is detected in the item 4 above, the ML starts the operation as the MCS in the control channel. If the control channel is not detected, the ML repeats the down-control channel search of the CMTS.

In accordance with the present invention, the following advantages are presented.

(1) When the MCS which shares the frequency band with the CMTS is to be installed in an area, it is not necessary to change the frequency allocation of the entire area (for example, cell split) including the CMTS, and the freedom in the MCS installation is significantly enhanced.

(2) Since the MCS sets the communication path at its own judgement by utilizing the idling channel, the utilization efficiency of the frequency in the area is significantly improved. The transmission output power of the MCS can be suppressed low and the zone minimization is attained.

(3) Since the MCS of the CMTS is in the same frequency band, the mobile terminal station can easily access to the both.

What is claimed is:

1. A method for allocating channels to a microcellular system sharing a frequency band with a mobile telephone system, said method comprising the steps of:

selecting one or more voice channels of said mobile telephone system having a small reception level;

allocating one of said selected voice channels to a base station of said microcellular system for use as a control channel of said microcellular system; and choosing a voice channel for communicating in said microcellular system from said selected voice channels;

wherein the microcellular system includes means for scanning down-control channels of said mobile telephone system, storing their reception levels and selecting one or more down-control channels having a small reception level, means for determining those voice channels of said mobile telephone system which are controlled by said one or more selected down-control channels, and means for scanning said voice channels, storing their reception levels, and selecting voice channels having a small reception level for allocation to said microcellular system.

2. A method for allocating channels in a microcellular system sharing a frequency band with a mobile telephone system, comprising the steps of:

selecting one or more voice channels of said mobile telephone system having a small reception level;

allocating one or more of said selected channels to a base station of said microcellular system for use as a control channel of said microcellular system; and choosing a voice channel for communicating in said microcellular system from said selected voice channels, wherein a mobile terminal operating within said microcellular system has means for receiving one or more of said control channels of said mobile telephone system and selecting therefrom a control channel having a small reception level, means for searching voice channels of said mobile telephone system which are controlled by said selected control channel, and means for receiving and scanning said voice channels to detect a control channel of said microcellular system having a reception level above a predetermined value, said mobile terminal receiving information from said control channel identifying said voice channel for communicating in said microcellular system.

3. A method for allocating channels to a microcellular system sharing a frequency band with and operating in the same area as a cellular mobile telephone system, wherein said microcellular system performs the steps of:

(a) repetitively scanning the control channels of said cellular mobile telephone system and selecting therefrom one or more control channels having a reception level below a predetermined threshold value;

(b) repetitively scanning the voice channels of said cellular mobile telephone system which are controlled by said one or more selected control channels for a time period substantially longer than the duration of voice communications to determine the maximum reception level of each of said voice channels during said time period;

(c) generating and storing a list of voice channels selected from said scanned voice channels, based solely upon information obtained as a result of said scanning, wherein said maximum reception level of each voice channel on said list is below a predetermined threshold value;

(d) allocating one or more channels from said list to a base station of said microcellular system for use as a control channel therein; and (e) allocating channels from said list for use as voice channels by said microcellular system.

4. The method of claim 3, wherein a base station of said microcellular system performs the further steps of:

receiving information from a controller of said microcellular system identifying the voice channels allocated thereto;

sequentially scanning said allocated voice channels to determine an available voice channel having a reception level below a predetermined threshold; and assigning said available voice channel to a mobile terminal operating within said microcellular system.

5. A method by which a mobile terminal operating within a microcellular system and a cellular mobile telephone system locates a channel transmitting control information for said microcellular system, said microcellular system sharing a frequency band with the voice channels of a cellular mobile telephone system which operates in the same area, wherein said mobile terminal performs the steps of:

scanning control channels of said cellular mobile telephone system to identify those control channels having a reception level below a predetermined threshold value;

determining the voice channels of said cellular mobile telephone system which are controlled by said identified control channels;

scanning the determined voice channels to eliminate channels used by said cellular mobile telephone system and to identify a voice channel which is transmitting control information for said microcellular system.

6. A microcellular system which shares a frequency band with and operates in the same area as a cellular mobile telephone system, said microcellular system comprising:

means for receiving and repetitively scanning the voice channels of said cellular mobile telephone system, said voice channels being controlled by one or more selected control channels of said cellular mobile telephone system, selected by said microcellular system repetitively scanning all of said control channels and selecting therefrom one or more control channels having a reception level below a predetermined threshold value, over a time period substantially longer than the duration of voice communications;

means for determining the maximum reception level of each of said voice channels during said time period;

means for comparing said reception level of each of said voice channels to a predetermined value;

means to select voice channels having a reception level during said time period that is lower than said predetermined value;

means for storing a list of selected voice channels; and means for allocating one or more channels from said list of said selected voice channels for use by said microcellular system.

7. The microcellular system of claim 6, further comprising at least one base station having a voice channel search receiver for scanning said selected voice channels allocated for use by said microcellular system to identify a voice channel having a reception level that is lower than a predetermined value, said base station assigning said identified voice channel to a mobile terminal in response to a communications request.

* * * * *